United States Patent
Nishimura

[11] 3,914,021
[45] Oct. 21, 1975

[54] LIQUID CRYSTAL DISPLAY DEVICE WITH IMPROVED CONTACT MEANS

[75] Inventor: Izuhiko Nishimura, Suwa, Japan

[73] Assignee: Kabushiki Kaisha Suwa Seikosha, Tokyo, Japan

[22] Filed: May 3, 1974

[21] Appl. No.: 466,947

Related U.S. Application Data
[63] Continuation-in-part of Ser. No. 269,694, July 7, 1972, abandoned.

[30] Foreign Application Priority Data
July 9, 1971    Japan................................ 46-50872

[52] U.S. Cl....... 350/160 LC; 339/17 CF; 339/17 L
[51] Int. Cl.²............................................ G02F 1/16
[58] Field of Search .......... 350/160 LC; 339/17 CF, 339/17 L

[56] References Cited
UNITED STATES PATENTS
| | | | |
|---|---|---|---|
| 3,601,774 | 8/1971 | Stathos et al.................. | 339/17 L X |
| 3,646,504 | 2/1972 | Classon........................ | 339/17 L X |
| 3,731,986 | 5/1973 | Fergason.......................... | 350/150 |

*Primary Examiner*—Edward S. Bauer
*Attorney, Agent, or Firm*—Blum, Moscovitz, Friedman & Kaplan

[57] ABSTRACT

In a liquid crystal display device having opposing plates, the plates are so disposed that at least one edge of one of the plates extends beyond an edge of the other. The exposed edge has contact areas thereon connected to conductive areas in the display portion of the device. A frame holds the plates in position with respect to each other and the frame has mounted thereon resilient conductive fingers so positioned that each one makes contact with a separate contact area on the extended edge, the contact being restricted in area to increase the contact pressure. These conductive fingers are resilient and provide a convenient means for removably connecting each of the contact areas to an outside voltage source. Wiping contact between the fingers and the contact area may be provided.

10 Claims, 7 Drawing Figures

LIQUID CRYSTAL DISPLAY DEVICE WITH IMPROVED CONTACT MEANS

CROSS-REFERENCE TO RELATED APPLICATION

The present application is a continuation-in-part application of parent application having the Ser. No. 269,694, filed July 7, 1972 and now abandoned under the title LIQUID CRYSTAL DISPLAY DEVICE by the same inventor. The priority of the parent application is hereby claimed.

BACKGROUND OF THE INVENTION

In a conventional liquid crystal display device the opposing plates which form the principal walls of the chamber containing liquid crystal material are of the same size and shape and are in registry with each other. Since the spacing between the plates is of the order of thousandths of an inch, it has been found to be difficult to make contact from the conductive areas of the plates to an external source of voltage. Moreover, it is especially difficult to make contacts which are sturdy as well as readily makeable and breakable. This latter feature is particularly valuable when it may be desired to change a display within an instrument.

SUMMARY OF THE INVENTION

In a liquid crystal display device, opposing plates forming a cell for holding liquid crystals are so disposed with relation to each other that at least one edge of one plate extends beyond an edge of the opposing plate. Contact areas corresponding in number to the number of conductive areas in the display region of the plate having the extended edge are disposed proximate said extended edge making them readily accessible for establishment of external connection to an outside voltage source. The display device is mounted in a frame in which are mounted resilient fingers which make contact with each of the contact areas on each extended edge, each finger making contact at an end or edge of the end portion thereof.

An embodiment is disclosed in which electrical connection is made between contact areas on one plate and contact areas on the other plate so that only an edge of one plate bearing contact areas thereon need extend beyond the other plate, as a result of which the resilient fingers make contact with contact areas on only one plate. Also, the fingers may be so shaped that spring contact is made as the frame, i.e., mounting means, is brought into registry with the cell.

Accordingly, an object of the present invention is to provide an improved liquid crystal display device connected to an outside source of voltage by means of reliable pressure contacts.

Another object of the present invention is to provide an improved liquid crystal display device which can be held in a frame and which can be readily removed and replaced.

A further object of the present invention is to provide an improved liquid crystal display device in which electrical contacts to an outside source of voltage are sturdy and free of the risk of accidental breakage.

Yet another object of the present invention is a liquid crystal display device suitable for mass production at low cost.

An important object of the present invention is an improved liquid crystal display device in which resilient contact fingers are mounted in a frame and can be brought against contact areas in a liquid crystal display device in such a way as to make high pressure contacts.

A significant object of the present invention is a liquid crystal display device in which resilient conductive fingers can be brought against contact areas in a liquid crystal cell to make wiping contact.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWING

For a fuller understanding of the invention, reference is had to the following description taken in connection with the accompanying drawings, in which.

DESCRIPTION OF THE PREFERRED EMBODIMENTS

Figure 1:
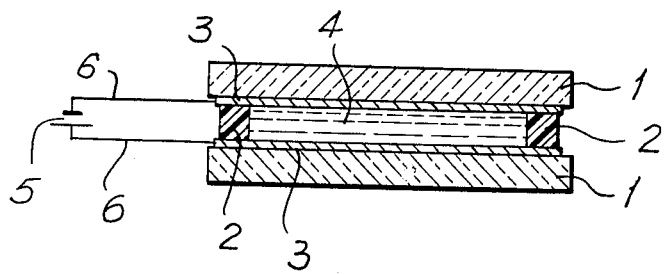
FIG. 1 is a cross sectional view of a liquid crystal display device in accordance with the prior art.
Figure 2:
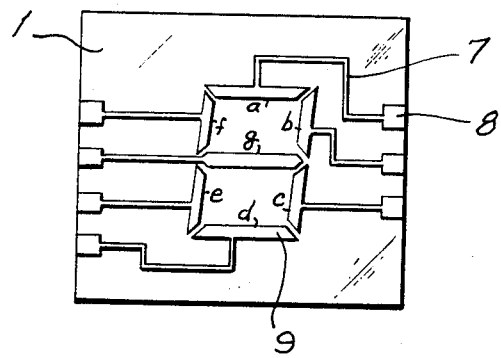
FIG. 2 is a plan view of a liquid crystal display device for displaying numerical digits in accordance with the prior art.

In the liquid crysal display device of FIG. 1, transparent plates 1 having conductive films 3 on the interior surfaces thereof are separated by spacer 2 defining a chamber containing liquid crystal material 4. Leads 6 make contact with conductive films 3 at the edges thereof exterior to spacer 2. These leads 6 connect conductive films 3 to outside source of voltage 5. Since the spacer 2 has a thickness of the order of thousandths of an inch, it is evident that establishing contact between leads and conductive films 3 presents serious problems.

Where the display device is designed to show indicia such as numerals, an arrangement of segments such as those labelled *a* to *g* is generally used. Assuming that only one digit is to be shown, the number of external contacts to be made at the edges of a plate is seven. Contact areas 8 are connected to the segments *a* through *g* by means of conductive-film strip leads 7. The multiplicity of contact areas 8 on plate 1 to which electrical contact must be made increases the probability of a poor contact to the external voltage source and thereby decreases the reliability of the display device seriously.

Figure 3:
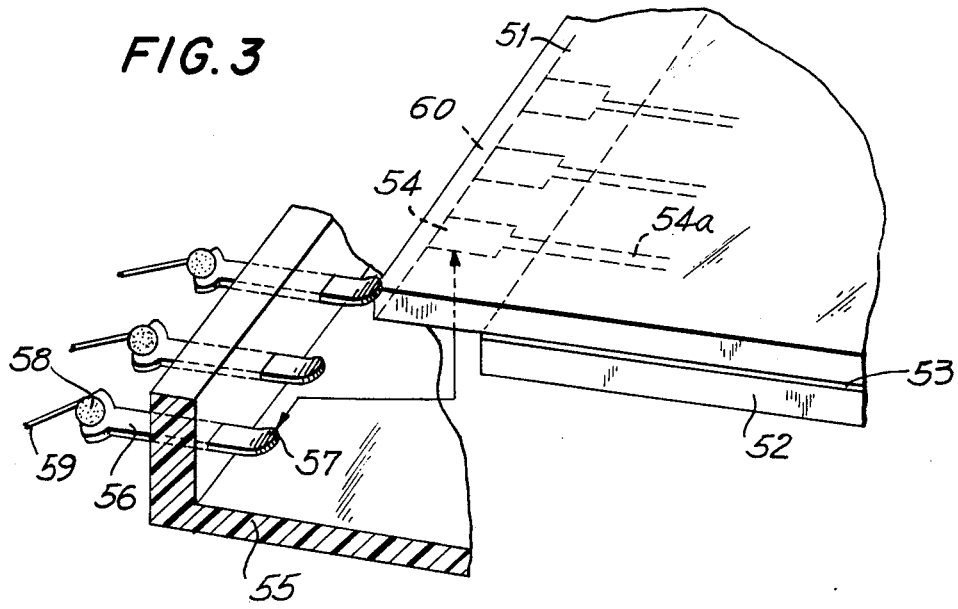
FIG. 3 is an exploded perspective view in partial cross-section of a liquid crystal display device in accordance with the present invention.

A means of avoiding the aforenoted problem, in accordance with the present invention, is shown in FIG. 3, where the edge of plate 51 extends beyond, i.e., overlaps, plate 52. Contact areas 54 are disposed proximate overlapping edge 60 and are each connected to a conductive area in the display region of the device by conductive-film-strip lead 54a. Frame 55 of a nonconductive material and preferably of molded plastic has molded therein resilient metal strips 56. Each of said strips 56 has a terminal 58 to which can be joined a conductive lead 59 leading to an outside source of voltage. At the other extremity of each lead 56 is a contact tip 57 which makes electrical contact with contact area 54 when the plates of the display device are introduced into the frame 55. The relative dimensions of the plates with spacer therebetween and the frame 55 holding the resilient strips 56 is such that when the plates are introduced into the frame the upwardly bent tips 57 are displaced downwardly, thus ensuring excellent mechanical and electrical contact between tips 57 and contact areas 54. Each of the tips 57 makes contact at an edge thereof with contact area 54, thereby providing high contact pressure at the restricted contact area and consequently reliable electrical connection between said resilient strip and said contact area.

Figure 4:
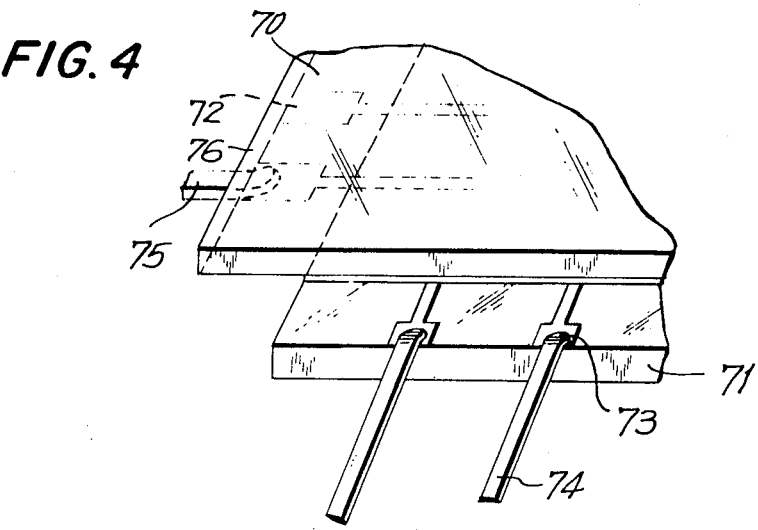
FIG. 4 is a partial perspective view of an embodiment of the present invention in which each plate has an edge extending beyond the other.

It is possible to have an edge of each plate overlapping an edge of the opposite plate. Such an arrangement is shown in FIG. 4, where edge 76 of plate 70 overlaps an edge of plate 71. Similarly, edge 77 of plate 71 overlaps an edge of plate 70. Contact areas 72 on overlapping edge 76 make electrical contact with resilient fingers 75. Contact areas 73 on plate 71 make electrical contact with resilient fingers mounted in molded frame 55.

Figure 5:
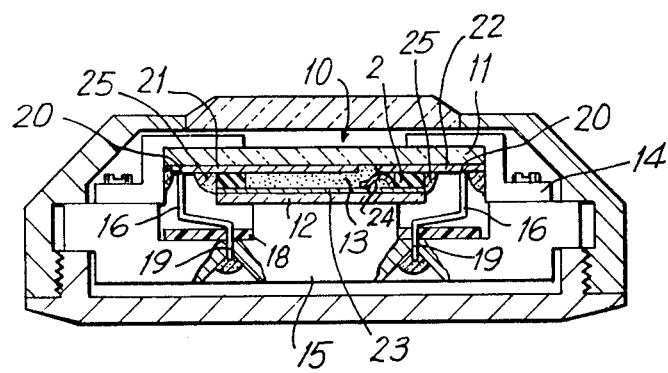
FIG. 5 is a sectional view of a timepiece including a liquid crystal display device in accordance with the present invention.

Since it may prove inconvenient to arrange to make contact with the interior surfaces of both plates in a liquid crystal display device, an embodiment such as is shown in FIG. 5 may be used to avoid this difficulty. Lower plate 12 has thereon a conductive film 23 which extends towards the side of the plate, and preferably, at least as far as spacer 2. Electrical contact is then made by suitable means between conductive film 23 and conductive film-strip 22, which is electrically isolated from conductive film 21. Electrical contact may be made between conductive film 23 and conductive film-strip 22 by resilient spring means 24 or by a conductive resin such as an epoxy resin filled with a conductive material such as aluminum powder. Preferably, where a conductive resin is used, it is resilient. Alternatively, it may be an adhesive, but this carries with it the disadvantage that it is difficult to separate plates 11 and 12 in the event that it is desired to replace liquid crystal material 13.

In the embodiment shown in FIG. 5, upper plate 11 overlaps lower plate 12 at both edges. However, by suitable arrangement of the strip leads as represented by strip lead 22, it is possible to have all of the strip leads emerging from the cell formed by plates 11 and 12 at one edge, so that overlap at only one edge is necessary. In the embodiment shown in FIG. 3, the cell is sealed with an organic resin 25, which, preferably, is an epoxy resin of conventional composition. As is evident, where plates 11 and 12 of the liquid crystal cell are sealed together with resin at the edges, as indicated by the reference numeral 25, then there is no disadvantage in using a conductive adhesive to make electrical contact between conductive films 22 and 23.

In the watch of FIG. 5 the cell is indicated generally by the reference numeral 10. Circuitry 15 including known components such as quartz crystal oscillators providing a time frequency standard, frequency dividers and decoders is connected by fingers 16 making contact to said circuitry at lower ends 9 and making contact to contact areas of films 21 and 22 on upper plate 11 by means of upper tips 20 of fingers 16. Cell 10 and frame 18 are held together and in registry by brackets 14, brackets and frame 18 together serving to mount the cell and the circuitry connected thereto.

As aforenoted, in the embodiment of FIG. 3, the upwardly turned fingers 57 make contact with contact areas 54 over a severly limited contact area, as a result of which the contact pressure between tip 57 and contact area 54 is high. This is desirable since it ensures good mechanical contact, and as a result, good electrical contact. In the embodiment shown in FIG. 6, two contact means which provide contact over a highly restricted area are shown. Resilient strip 16 has a square edge 20 for bearing against conductive areas 21 and 22 (FIG. 5). Depending upon the exact angle between the end area 20 and the body of the resilient strip 16, either the entire end face 20 or an edge thereof may make contact with the conductive film on the lower surface of plate 11. In either case, the area of contact is low, so that the contact pressure, expressed as force/unit area, is high. Another shape which has been found useful for the same purpose is that indicated by the reference numeral 20a. As shown in this version, the top end of resilient strip 16a is rounded. In another embodiment, shown at 20b, the end of resilient strip 16b is pointed. As with the other embodiments, the objective is to reduce the contact area and thereby to increase the contact pressure.

Figure 7:
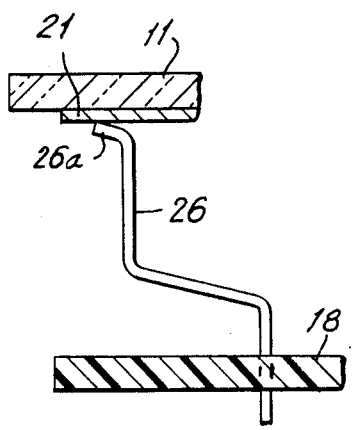
FIG. 7 is a view in partial section of a resilient conductive finger adapted for making wiping contact with a contact area.

A further embodiment of a resilient strip for making contact with film 21 is shown in FIG. 7, where resilient strip 26 has an upper end which is bent over until it is almost horizontal. The upper end indicated by the reference numeral 26a. This type of contact has the advantage that as frame 18 is raised so that strip 26 makes contact with film 21, a wiping action takes place. In the embodiment shown, the end 26a is cut to provide a sharp edge. Where there is danger of scraping the conductive film 21 from plate 11, the region of 26a making contact with conductive film 21 may be rounded (not shown).

Figure 6:
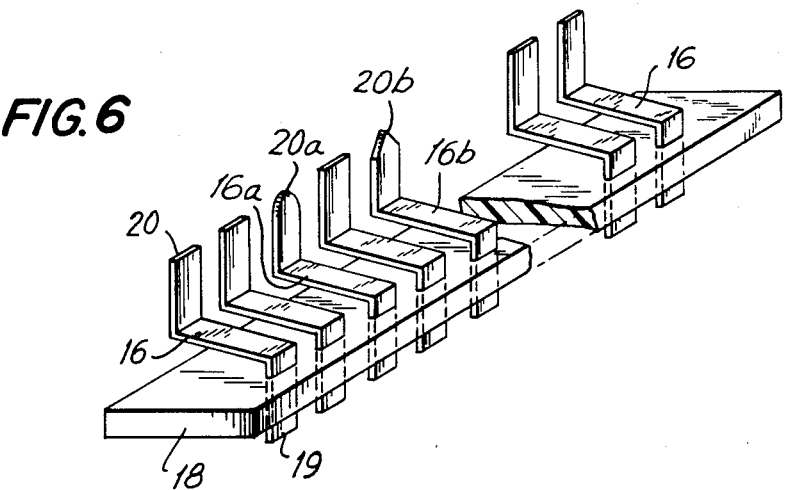
FIG. 6 is a view in perspective of resilient conductive fingers adapted for making contact with contact areas in accordance with the present invention.

Although resilient fingers having different types of upper ends are shown mounted in a single frame 18 in FIG. 6, in general, though not necessarily, all of the fingers in a single frame will be of one type.

The reliability of the electrical contact made mechanically between fingers 57 and contact areas 54 (or contact areas 72, 128 or 132) is improved by applying a tarnish-resistant metal such as silver or gold to the contact areas. The silver or gold may be applied by evaporation, electroplating or even in the form of a paint.

It will thus be seen that the objects set forth above, among those made apparent from the preceding description, are efficiently attained, and since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a liquid crystal display device comprising opposing insulating plates and a spacer defining a chamber containing liquid crystals, at least one conductive area on the interior of each of said plates and within the display region of said device, a separate contact area proximate an edge of at least one of said plates and exterior to said spacer, said contact areas corresponding in number to the number of conductive areas on said plates, and a strip lead connecting each conductive area to a corresponding contact area, the improvement wherein said insulating plates are of such size and are so positioned that at least one edge of one plate having contact areas proximate said edge projects beyond an edge of the other of said opposing plates, thereby making the contact areas proximate said extended edge readily accessible for connection to an outside source of voltage, and comprising a plurality of resilient conductive fingers for making contact with each of said contact areas and mounting means holding said fingers as a unit and shaped for holding said fingers firmly in mechanical contact with said contact areas when said mounting means is brought into registry with said plates, said fingers being so shaped and so disposed in said mounting means that each of said fingers makes contact with a corresponding contact area under a sufficiently high bising spring force and over a sufficiently restricted region so that contact pressure in said restricted region is high enough to ensure good electrical contact.

2. A liquid crystal display device as defined in claim 1, wherein said restricted region corresponds to the area of an end of said finger.

3. A liquid crystal display device as defined in claim 1, wherein said restricted region corresponds to an edge of said finger.

4. A liquid crystal display device as defined in claim 1, wherein said fingers are so shaped that as said mounting means is brought into registry with said plates, wiping contact is made between said fingers and said contact areas.

5. A liquid crystal display device as defined in claim 1, wherein each of said opposing plates has at least one edge having contact areas proximate thereto and extending beyond an edge of the opposing plate and said mounting means has resilient fingers mounted thereon making electrical contact with each contact area on each of said opposing plates.

6. A liquid crystal display device as defined in claim 1, wherein said contact areas are covered with a metal of high tarnish-resistance chosen from the group consisting of silver and gold.

7. A liquid crystal display device as defined in claim 1, wherein the conductive areas on one of said opposing plates are segmented and grouped so as to be able to display at least one character, the conductive areas on the other plate are of such size and so located that each conductive area on said other plate opposes the group of segments of a single character, each said other plate has contact areas equal in number to the number of conductive areas and conductive-film leads from each of said conductive areas to said contact areas, said one plate has a contact area directly opposite each of said contact areas on said other plates, connecting means makes electrical contact between each of said contact areas on said other plate and the opposite contact area on said one plate, said one plate has at least one edge extending beyond an edge of said other plate, said one plate has additional contact areas corresponding in number to said opposite contact areas on said extended edge of said one plate, said one plate has conductive-film leads connecting each of said opposite contact areas to a corresponding additional contact, and said mounting means has flexible contact fingers thereon, said fingers corresponding in number to the total number of contact areas on said extended edge of said one plate, thereby making it possible to connect all of said conductive areas on both plates to an outside voltage source through the use of fingers making contact with contact areas on said one plate only.

8. A liquid crystal display device as defined in claim 7, wherein said connecting means is a conductive, resilient metal spring.

9. A liquid crystal display device as defined in claim 7, wherein said connecting means is a conductive, resilient organic resin.

10. A liquid crystal display device as defined in claim 1, wherein said mounting means holds said plates together.

* * * * *